United States Patent [19]

Bowers, Jr. et al.

[11] Patent Number: 5,672,397
[45] Date of Patent: Sep. 30, 1997

[54] COMPOSITE ARTICLE OF AN AUTOMOTIVE VEHICLE

[75] Inventors: Holton D. Bowers, Jr., Northville; Stephen F. Lange, Farmington Hills, both of Mich.

[73] Assignee: Chrysler Corporation, Auburn Hills, Mich.

[21] Appl. No.: 542,499

[22] Filed: Oct. 13, 1995

[51] Int. Cl.$^6$ .................................................. B60R 13/04
[52] U.S. Cl. ......................................... 428/31; 428/16
[58] Field of Search ....................................... 428/16, 31

[56] References Cited

U.S. PATENT DOCUMENTS

| | | | |
|---|---|---|---|
| 3,654,062 | 4/1972 | Loew | 428/16 X |
| 4,356,617 | 11/1982 | Coscia | 428/31 X |
| 4,605,575 | 8/1986 | Auld et al. | 428/31 X |
| 4,948,637 | 8/1990 | Kessler | 428/31 |

*Primary Examiner*—Henry F. Epstein
*Attorney, Agent, or Firm*—Edward A. Craig

[57] ABSTRACT

A composite article such as an automotive trim strip comprising a thermoplastic shell secured to the front of a supporting member. An icon is embedded in a recess in the front of the shell so that the front of the icon is substantially flush with the front of the shell. The icon is secured in the recess of the shell by an adhesive. The supporting member is made of a hot melt material and is bonded to the shell in an injection mold. The heat of the molding operation softens the thermoplastic shell sufficiently to cause the icon to form a recess in the shell and become embedded therein. The heat of the molding operation also cures the adhesive bonding the icon to the shell.

1 Claim, 4 Drawing Sheets

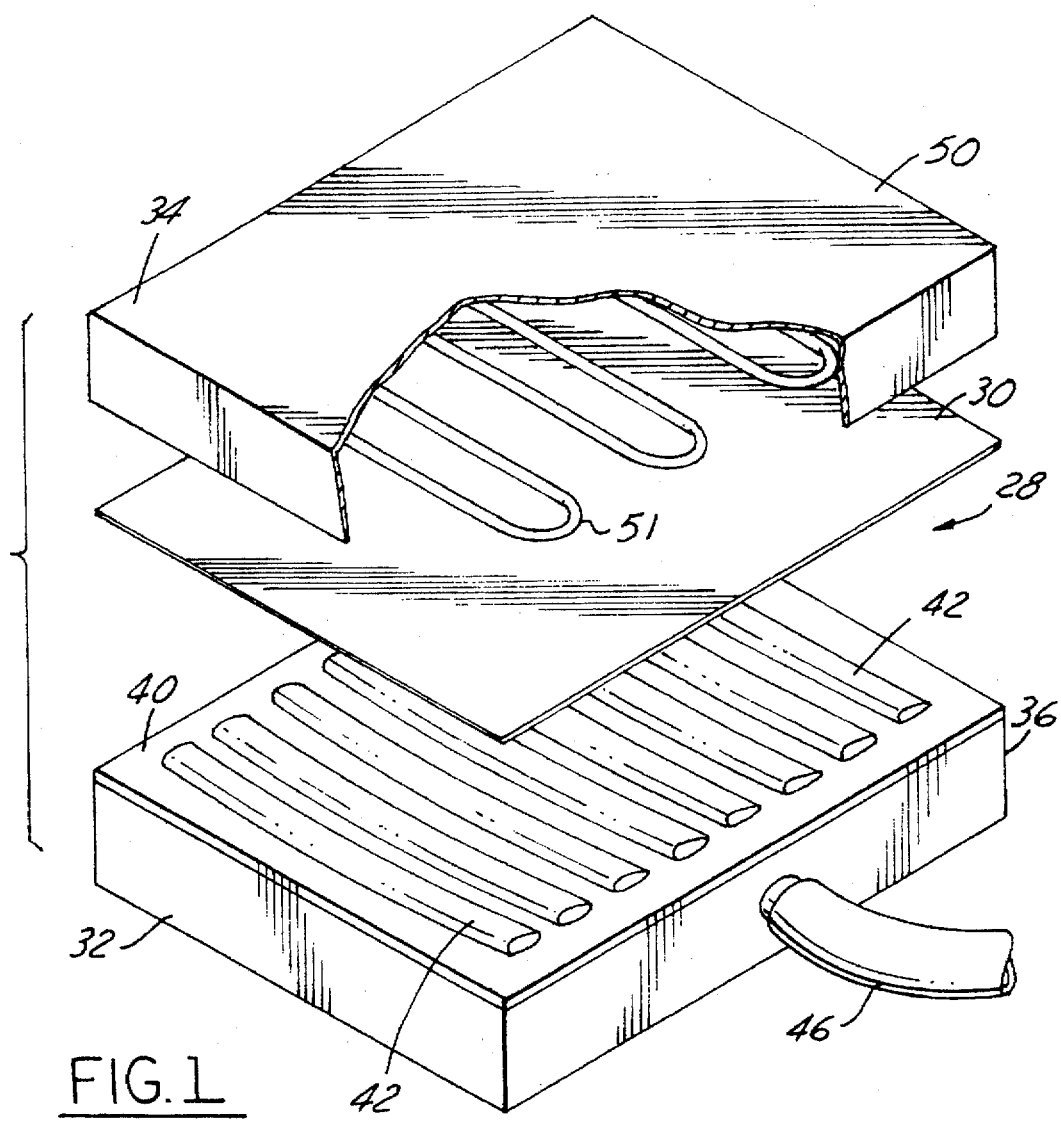
FIG.1
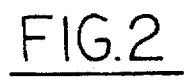
FIG.2
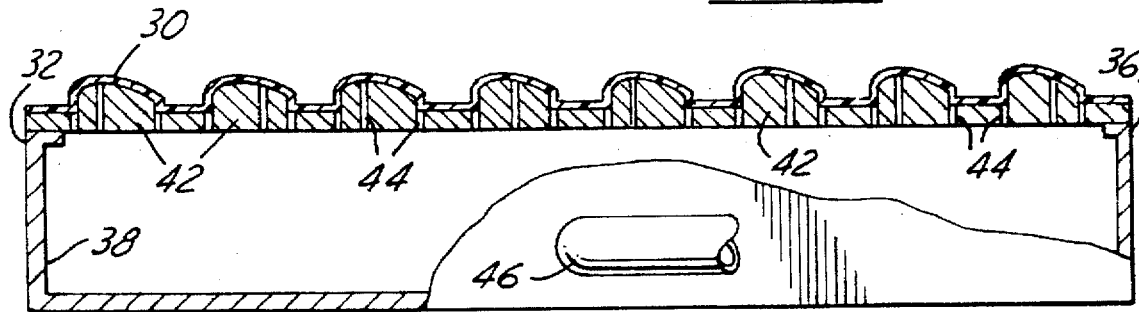

1

COMPOSITE ARTICLE OF AN AUTOMOTIVE VEHICLE

FIELD OF INVENTION

This invention relates to a composite article of an automotive vehicle such as an automotive trim strip having a device secured thereto.

BACKGROUND AND SUMMARY OF THE INVENTION

According to conventional practice, a device mounted on an article such as a trim strip for an automotive vehicle, is simply secured to the surface of the article by a suitable bonding agent or fastener. Because the device is exposed around the edges, it is often damaged or chipped away and in some cases actually stripped off when the vehicle is washed or waxed. A more secure, protected form of attachment is needed.

In accordance with the present invention, the article is a composite composed of a supporting member, a shell covering at least a portion of the supporting member, and a device in the form of a thin strip representative of an image embedded in a recess in the exposed surface of the shell. Preferably, the strip is flush with the surrounding surface of the shell and thus protected from being damaged or detached.

To make the article, the strip may be adhered to the front of a shell formed of a heat-softenable material. The shell with the adhered strip may be placed in a mold cavity in a position such that the front of the shell and the front of the strip face a surface of a mold cavity. Then a flowable hot melt material may be introduced into the mold cavity to form the supporting member and, at the same time, by the heat of the hot melt material, bond the shell to the supporting member and soften the shell enough to cause the strip to become embedded in the shell. Preferably, the strip has a roughened surface to improve its adherence to the shell.

The strip is adhered to the front of the shell by an adhesive which is cured by the heat of the hot melt material to provide a bond between the shell and the embedded strip. The adhesive is preferably a thermoplastic material which may, for example, be a polyamide or polyester. Preferably, the shell is formed of acrylonitrile-butadiene-styrene (ABS) or some other thermoplastic material.

One object of this invention is to provide a composite article of the type described above having the foregoing features and capabilities.

Another object is to provide a composite article which is rugged and durable in use, and is capable of being inexpensively manufactured.

Other objects, features and advantages of the invention will become more apparent as the following description proceeds, especially when considered with the accompanying drawings.

BRIEF DESCRIPTION OF THE DRAWINGS

FIG. 1 is a perspective view showing an open vacuum mold for manufacturing a sheet of shells for the supporting member of a composite article constructed in accordance with this invention, in this instance an automotive trim strip.

FIG. 2 is a transverse sectional view showing the sheet of shells applied over the lower vacuum mold part in FIG. 1, with parts in elevation.

DETAILED DESCRIPTION OF THE PREFERRED EMBODIMENTS

Figure 9:
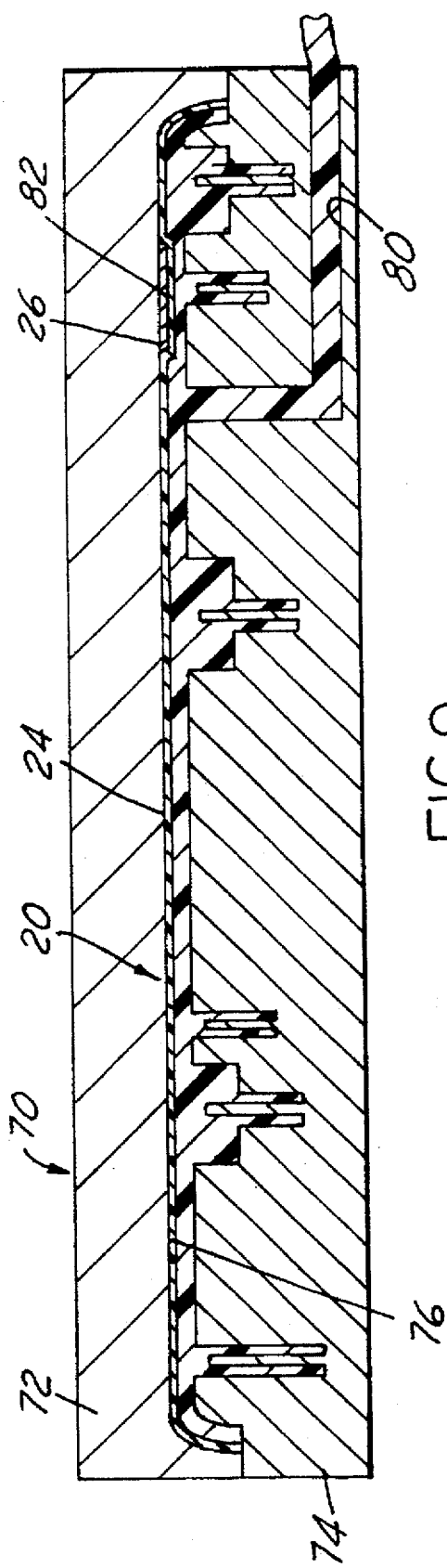
FIG. 9 is a sectional view showing the injection mold of FIG. 8 after the mold parts have been closed and a hot melt material has been introduced into the mold.
Figure 10:
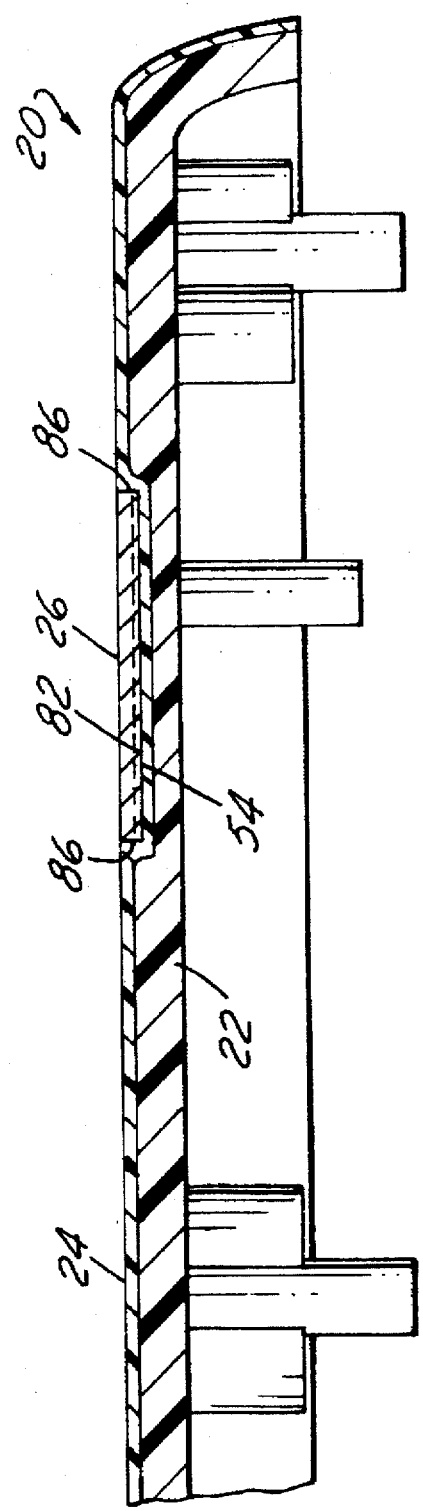
FIG. 10 is a sectional view of the composite article of this invention consisting of the strip embedded in the shell and the shell applied to a surface of the supporting member formed in the mold.

Referring now more particularly to the drawings, and especially to FIGS. 9 and 10, the composite article 20 of this invention comprises an elongated supporting member 22, and an elongated shell 24 covering the front surface of the supporting member. The supporting member 22 and the shell 24 together make up the trim strip of an automotive vehicle. A device in the form of a strip 26 representative of an image is secured to the exposed front surface of the shell 24.

Figure 3:
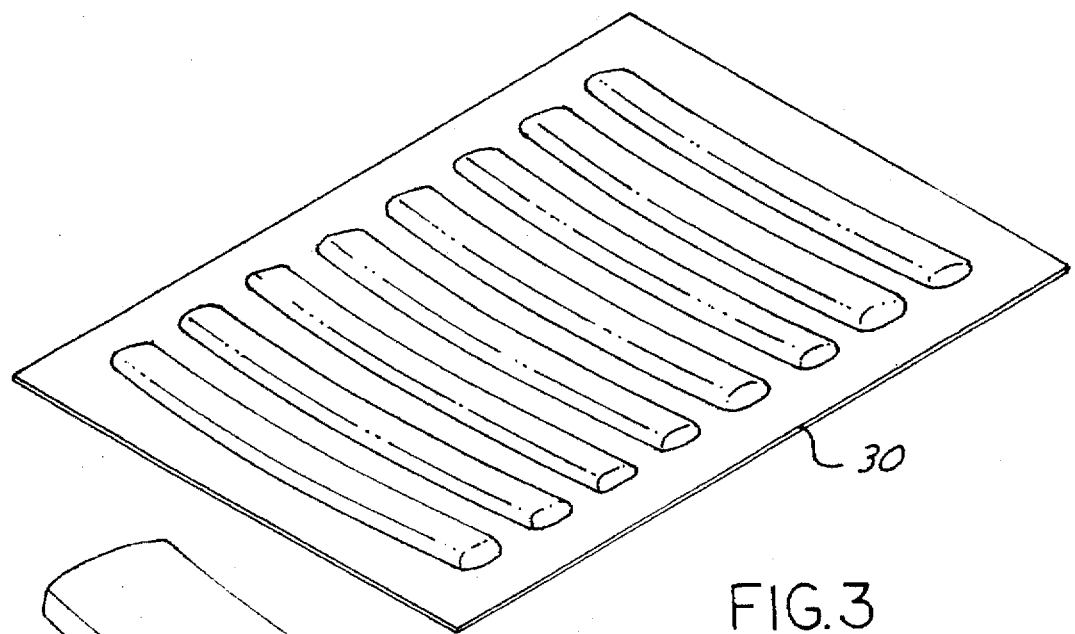
FIG. 3 is a perspective view of a finished sheet in which a plurality of shells have been molded in the mold of FIG. 1.
Figure 4:
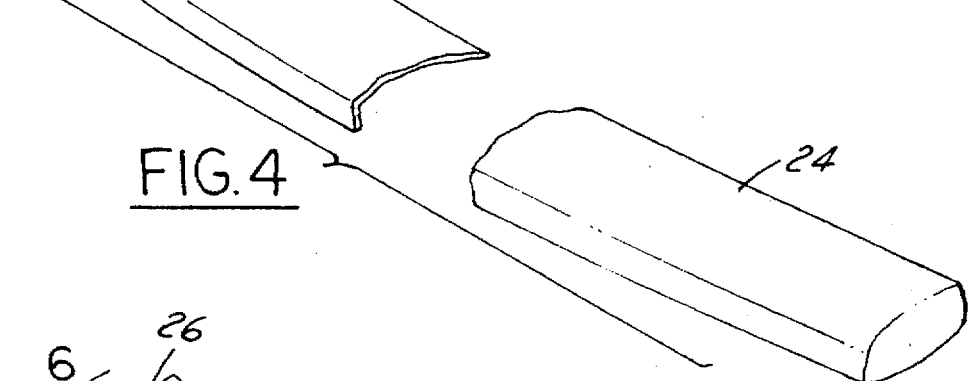
FIG. 4 is a perspective view of one of the shells after it has been trimmed from the sheet in FIG. 3.

FIG. 4 shows the shell 24 and FIGS. 1–3 show a vacuum mold 28 for forming a plurality of shells from a sheet 30 of thermoplastic material. The shells 24 are simultaneously formed from the sheet 30 in the vacuum mold and then individually cut from the sheet. The thermoplastic sheet 30 may, for example, be made of acrylonitrile-butadiene-styrene (ABS).

The vacuum mold 28 comprises a lower mold part 32 and an upper mold part 34. The lower mold part 32 is in the form of a rectangular box-shaped housing 36 having a vacuum chamber 38 therein. The top wall 40 of the housing 36 has a plurality of elongated, laterally spaced apart, raised mold forms 42 of like configuration to form and shape a plurality of shells. Vacuum passages 44 in the top wall 40 extend from the vacuum chamber through the mold forms 42. A vacuum line 46 leads to the chamber 38.

The upper mold part 34 is in the form of a rectangular box-shaped housing 50 of about the same size as the lower mold part 32 and contains an elongated heating element 51.

To form the shells to shape from the sheet 30, the sheet, which may be preheated if desired, is laid over the mold forms 42 on the top wall 40 of the lower mold part, as shown in FIGS. 1 and 2. The upper mold part is brought down on the lower mold part to close the vacuum mold, and the heating element 51 is energized to a temperature sufficient to soften the sheet 30. Vacuum applied to chamber 38 draws the sheet down tightly on the mold forms 42 as in FIG. 2. After a period of time required for the softened sheet to take the form of the mold forms, the mold is opened and the sheet is allowed to cool after which it is removed. The finished sheet is shown in FIG. 3 and retains the configuration imparted to it in the vacuum mold. The individual shells 24 may be cut or trimmed from the sheet and appear as shown in FIG. 4. The shells are preferably on the order of about 0.020" thick.

Figure 5:
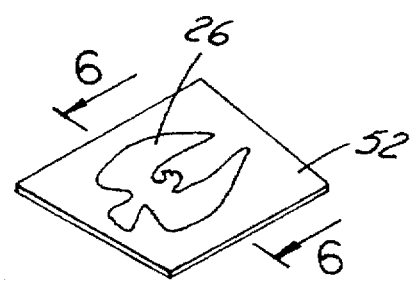
FIG. 5 is a perspective view of an strip shown attached to a carrier strip.
Figure 6:
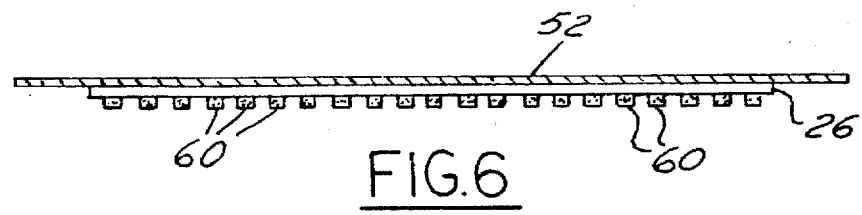
FIG. 6 is an enlarged sectional view taken on the line 6—6 in FIG. 5.

The device or strip 26 is shown in FIGS. 5 and 6. The strip may be any image, symbol, design or words or a combination thereof or any other representation that may be desired. In FIG. 5, the strip is the design of an eagle. The strip may be made of metal and may, for example, be chrome-plated nickel or gold-plated nickel, as desired. The strip is very thin. For convenience, the strip may initially have its front side adhered to a transfer strip 52. The transfer strip 52 may be a transparent plastic such, for example, as Mylar which is a trademark for a polyester.

A plurality of spaced-apart globs 60 of an adhesive are applied to the exposed back of the strip 26. The globs 60 are preferably formed of a heat-curable adhesive of a type which is at least tacky at room temperature and cures at the higher temperature of a subsequent injection molding operation to be described hereinafter. The adhesive may be a polyamide or a polyester.

Figure 7:
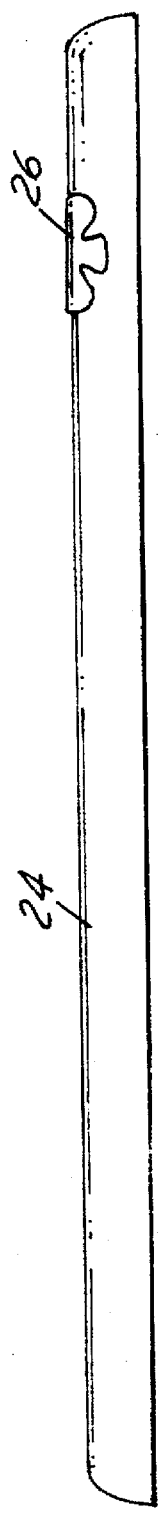
FIG. 7 is an elevational view showing the strip applied to a surface of the shell.

The strip 26 is applied to the front surface of the shell 24 by pressing its adhesive coated back against the shell and peeling away the Mylar carrier strip. FIG. 7 shows the strip applied to the shell after the Mylar carrier strip has been peeled away.

Figure 8:
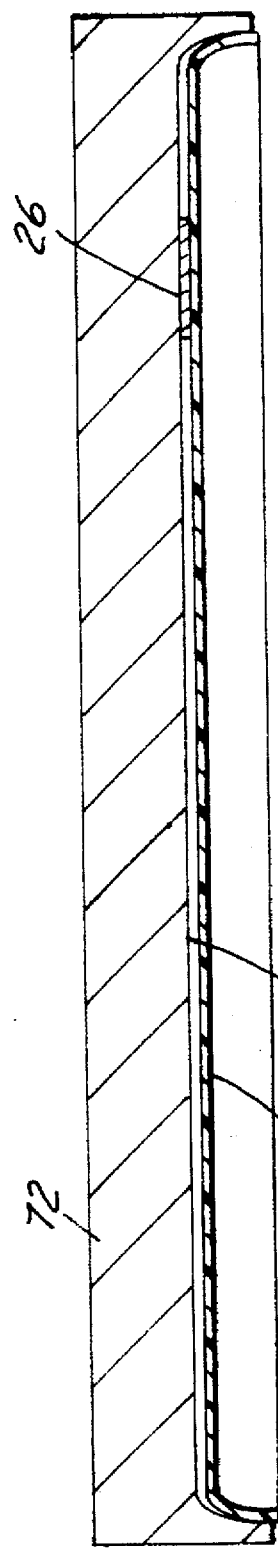
FIG. 8 is a sectional view of an open injection mold with the shell and applied strip of FIG. 7 inserted in one of the mold parts.

Next, the shell with the strip adhered to its front surface is placed in an injection mold 70. The injection mold 70 is composed of two parts 72 and 74. The shell with the strip adhered to it is placed in the upper mold part as shown in FIG. 8 with its front surface, and the front surface of the strip, facing a mold surface 76. This mold surface 76 is configured to match the configuration of the shell.

The injection mold is closed by bringing the mold parts 72 and 74 together as shown in FIG. 9 defining a mold cavity beneath the shell in which the supporting member 22 of the composite article is formed and molded. As seen in FIG. 9 a thermoplastic hot melt material, such as ABS, may be introduced into the injection mold through the inlet 80. The hot melt material is heated to be flowable and fills the mold to form the sturdy supporting member 22. The hot melt material is introduced under enough pressure to force the shell 24 into full surface-to-surface contact with the mold surface 76 of the mold part 72. The hot melt material and shell are compatible and bond to one another. The heat of the hot melt material is sufficient to soften the shell 24 and cause the strip 26 to form a recess 82 in the shell and the strip to become embedded in the recess. At the same time, the heat of the hot melt material is sufficient to cure the adhesive 60 to form a strong bond between the back of the strip and the bottom of the recess. This bond is increased by the ridges and grooves 54 and 56 in the back of the strip. The heat of the molding operating will vary depending upon the hot melt material used but may be about 400° F. This degree of heat is enough to soften the shell and cause the strip to become fully embedded in the shell with the front surface of the strip substantially flush with the front surface of the shell.

After a period of time sufficient to permit cooling and setting and bonding together of the hot melt material and shell, the mold is opened and the composite article consisting of the supporting member 22, shell 24 and strip 26, is removed.

The strip in the finished composite article is protected on all sides around its periphery by reason of the fact that it is fully embedded in the shell with its front surface flush with the front surface of the shell. The peripheral edges 86 of the strip abut the peripheral edges of the recess and are protected and will not be chipped or damaged and the strip will not be inadvertently peeled away.

What is claimed is:

1. A trim strip for an automotive vehicle comprising:

a supporting member having a front, a shell having a front and a back and having its back secured to the front of said supporting member, said shell having a thickness on the order of about 0.020 inches, a recess in the front of the shell, said recess having a bottom surface and peripheral side edges surrounding said bottom surface, a thin strip representative of an image and having a front and a back and peripheral side edges, and means securing said strip in the recess of said shell with the back of the strip resting upon the bottom surface of the recess, the front of said strip being exposed and substantially flush with the front of said shell and the peripheral side edges of the strip abutting the peripheral side edges of the recess, said supporting member and said shell being formed of compatible thermoplastic materials and said supporting member being molded and heat-sealed to the shell, said means securing said strip in the recess of said shell being a heat-curable adhesive.

* * * * *